(12) United States Patent
Kubota

(10) Patent No.: US 7,711,172 B2
(45) Date of Patent: May 4, 2010

(54) AUTOMATIC NODULE MEASUREMENTS

(75) Inventor: Toshiro Kubota, Lewisburg, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 204 days.

(21) Appl. No.: 11/970,899

(22) Filed: Jan. 8, 2008

(65) Prior Publication Data

US 2008/0137970 A1 Jun. 12, 2008

Related U.S. Application Data

(63) Continuation-in-part of application No. 11/398,100, filed on Apr. 4, 2006.

(60) Provisional application No. 60/884,072, filed on Jan. 9, 2007, provisional application No. 60/669,415, filed on Apr. 8, 2005.

(51) Int. Cl.
 *G06K 9/00* (2006.01)
(52) U.S. Cl. ............... 382/131; 382/224; 382/128; 382/130; 382/154; 382/260; 435/6; 435/375; 435/180; 378/8; 378/62
(58) Field of Classification Search ............... 382/128, 382/131, 103, 154, 260, 224, 225; 435/6, 435/375, 180, 374, 287.2; 378/4, 8, 62, 901
 See application file for complete search history.

(56) References Cited

U.S. PATENT DOCUMENTS 5,936,628 A 8/1999 Kitamura et al.
6,891,922 B2 * 5/2005 Ferrant et al. ............ 378/62
7,187,800 B2 * 3/2007 Hibbard .................. 382/173
7,356,173 B2 * 4/2008 Wiemker et al. ......... 382/128
7,590,273 B2 * 9/2009 Kubota et al. ........... 382/131
2004/0105527 A1 * 6/2004 Ferrant et al. ........... 378/210
2008/0137970 A1 6/2008 Kubota

FOREIGN PATENT DOCUMENTS

WO WO2004/109580 A2 12/2004

OTHER PUBLICATIONS

CT Screening for Lung Cancer; Frequency and Significance of part solid and nonsolid nodules, Henschke et al ; May 2002.*
Henschke et al., "CT screening for lung cancer: Frequency and significance of part-solid and nonsolid nodules", Am. J. Roentgen. 178(2002), pp. 1053-1057.

(Continued)

*Primary Examiner*—Wesley Tucker
*Assistant Examiner*—Nancy Bitar

(57) ABSTRACT

A method for automatically estimating a measure of a nodule includes providing sliced image volume data comprising at least one marked position of the nodule, extracting a sub-volume from the sliced image volume data that includes the marked position, performing a figure-ground separation to determine a solid foreground of the sub-volume and a non-solid foreground of the sub-volume, determining a seed point corresponding to the nodule from each of the solid foreground and the non-solid foreground, selecting one of the seed point of the solid foreground or the seed point of the non-solid foreground, determining whether the selected seed point is solitary or non-solitary and performing region growing for non-solitary selected seed point, determining a segmentation of the selected seed point, estimating the measure of the nodule corresponding to the segmentation, and outputting the segmentation and an estimate of the measure of the nodule.

6 Claims, 3 Drawing Sheets

OTHER PUBLICATIONS

Kubota et al., "Estimating Diameters of Pulmonary Nodules With Competition-Diffusion and Robust Ellipsoid Fit", Computer Vision for Biomedical Image Applications 2005, pp. 324-334.

Kostis et al., "Three-dimensional segmentation and growth-rate estimation of small pulmonary nodules in helical CT images", IEEE Trans. on Medical Imaging, IEEE Service Center, Piscataway, NJ. vol. 22, No. 10, Oct. 1, 2003, pp. 1259-1274.

Tek et al., "Volumetric Segmentation of Medical Images by Three-Dimensional Bubbles", Computer Vision and Image Understanding, Academic Press, San Diego, CA, US, vol. 65, No. 2, Feb. 1997, pp. 246-258.

Okada et al., "Robust 3D Segmentation of Pulmonary Nodules in Multislice CT Images", Lecture Notes in Computer Science, Springer Verlag, Berlin, DE, vol. 3217, Sep. 26, 2004, pp. 881-889.

Rogowska, "Overview and Fundamentals of Medical Image Segmentation", Handbook of Medical Imaging Processing and Analysis, 2000, pp. 69-85.

Henschke et al., "CT Screening for Lung Cancer: Frequency and Significance of Part-Solid and Nonsolid Nodules", AJR:178, May 2002, pp. 1053-1057.

Zhao et al., "Automatic Detection of Small Lung Nodules on CT Utilizing a Local Density Maximum Algorithm", Journal of Applied Clinical Medical Physics, American College of Medical Physics, Melville, NY, US, vol. 4, No. 3, Jul. 2003, pp. 248-260.

Kubota et al., "Reaction-diffusion Systems for Hypothesis Propagation", Pattern Recognition, 2000. Proceedings. 15th International Conference on Sep. 3-7, 2000, Los Alamitos, CA, USA, IEEE Computer Science, US, vol. 3, Sep. 3, 2000, pp. 543-546.

Okada et al "Robust Anisotropic Gaussian Fitting for Volumetric Characterization of Pulmonary Nodules in Multislice CT", IEEE Transactions on Medical Imaging, IEEE Service Center, Piscataway, NJ, US, vol. 24, No. 3, Mar. 2005, pp. 409-423.

* cited by examiner

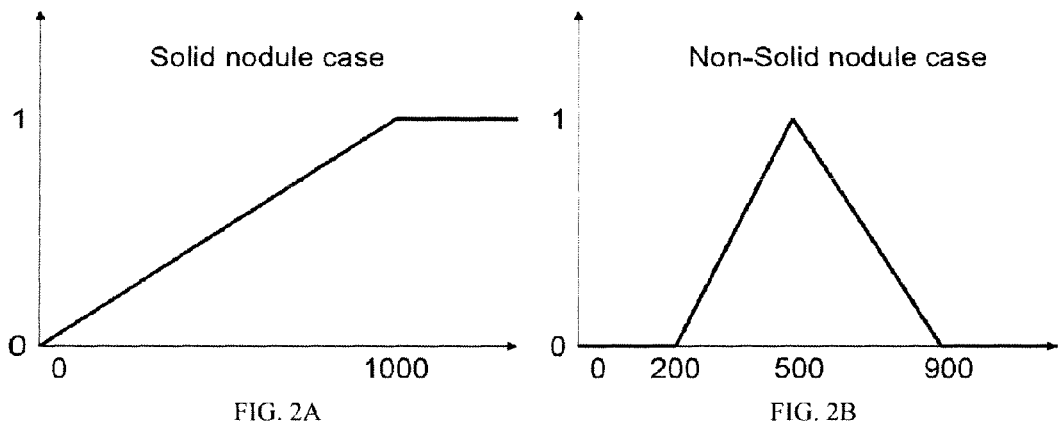
FIG. 2A
FIG. 2B
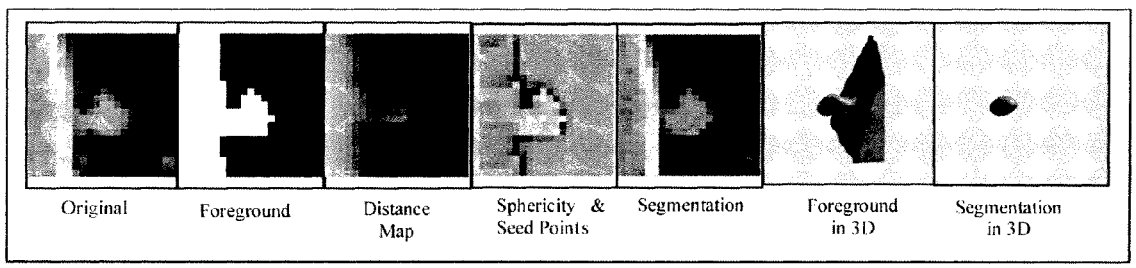
FIG. 3

US 7,711,172 B2

AUTOMATIC NODULE MEASUREMENTS

CROSS-REFERENCE TO RELATED APPLICATIONS

This application claims the benefit of Provisional Application No. 60/884,072 filed on Jan. 9, 2007 in the United States Patent and Trademark Office, the contents of which are herein incorporated by reference in its entirety.

This is a Continuation-In-Part Application of U.S. application Ser. No. 11/398,100, filed Apr. 4, 2006, which claims the benefit of Provisional Application No. 60/669,415 filed on Apr. 8, 2005 in the United States Patent and Trademark Office, the contents of which are herein incorporated by reference in their entirety.

BACKGROUND OF THE INVENTION

1. Field of the Invention

The present disclosure relates to image processing, and more particularly to a system and method for automatically estimating a volume and diameter of a pulmonary nodule from thin-slice volumetric data.

2. Description of Related Art

Measuring the size of pulmonary nodules from X-ray computed tomography (CT) data is an important practice for diagnosis and progression analysis of lung cancer. The nodule size often plays an important role in choosing proper patient care, and is also an effective feature to separate true nodules form nodule-like spurious findings. Typically, the size is represented by the diameter of the nodule. Automating this task for computer-aided diagnosis (CAD) is, however, a difficult problem due to intensity variations, partial volume effects, attachment to other structures, and noises.

A CT-based screening protocol specified by the International Early Lung Cancer Action Program (I-ELCAP) details how the diameter of pulmonary nodules should be measured and how the measurements should be used for determining the patient management. According to the protocol, the result of an initial CT screening of lung is considered positive if at least one solid or part-solid nodule with 5.00 mm or more in diameter or at least one non-solid nodule with 8.0 mm or more in diameter is found. Although these 5 mm and 8 mm thresholds are likely to drop as more accurate screening becomes possible with high resolution multi-detector helical CT (MDCT), the importance of nodule size in cancer diagnosis will stay unchanged.

Therefore, a need exists for automatically estimating a volume and diameter of a pulmonary nodule.

SUMMARY OF THE INVENTION

According to an embodiment of the present disclosure a method for automatically estimating a measure of a nodule includes providing sliced image volume data comprising at least one marked position of the nodule, extracting a sub-volume from the sliced image volume data that includes the marked position, performing a figure-ground separation to determine a solid foreground of the sub-volume and a non-solid foreground of the sub-volume, determining a seed point corresponding to the nodule from each of the solid foreground and the non-solid foreground, selecting one of the seed point of the solid foreground or the seed point of the non-solid foreground, determining whether the selected seed point is solitary or non-solitary and performing region growing for non-solitary selected seed point, determining a segmentation of the selected seed point, estimating the measure of the nodule corresponding to the segmentation, and outputting the segmentation and an estimate of the measure of the nodule.

According to an embodiment of the present disclosure a method for automatically estimating a measure of a nodule includes providing sliced image volume data comprising at least one marked position of the nodule, extracting a sub-volume from the sliced image volume data that includes the marked position, separating a background from a foreground including the nodule using a pixel-wise transform of voxel data of the sub-volume followed by a competition-diffusion operator, determining a solid foreground portion and a non-solid foreground portion of the foreground, determining a seed point for each of the solid foreground portion and the non-solid foreground portion by relocating the marked position to a center of the nodule, wherein a relocated positions are the seed points, selecting one of the seed points corresponding to the solid foreground or the non-solid foreground, determining whether a selected seed point is solitary, and determining a segmentation upon determining that the selected seed point is solitary, performing region growing to isolate the nodule upon determining that the selected seed point is non-solitary and determining the segmentation as a region of the selected seed point, determining the measure based on the segmentation using an axial slice with the largest area for the measure, and outputting the segmentation and the measure.

According to an embodiment of the present disclosure a system for automatically estimating a measure of a nodule includes a memory device storing a dataset comprising image volume data including marked positions of the nodule and a plurality of instructions embodying the system for estimating the measure of the nodule, and a processor for receiving the dataset and executing the plurality of instructions to perform a method for estimating the measure of the nodule.

BRIEF DESCRIPTION OF THE DRAWINGS

Preferred embodiments of the present invention will be described below in more detail, with reference to the accompanying drawings:

FIGS. 2A-B are graphs of pixel-wise initial transformations as a part of figure-ground separation according to an embodiment of the present disclosure;

FIG. 3 is a progression of exemplary results according to an embodiment of the present disclosure.

DETAILED DESCRIPTION OF PREFERRED EMBODIMENTS

According to an embodiment of the present disclosure, an automated method estimates a volume and diameter of a pulmonary nodule from thin-slice volumetric data (e.g., Computed Tomography (CT) data). Exemplary implementations include improving the performance of a Computer-Aided Diagnosis (CAD) system and aiding radiologists in assessing the growth of a nodule.

Embodiments of the present disclosure will be described with respect to an experimental set of 380 nodules in 184 CT volumes. The nodules were marked by expert radiologists and represented by positions (marked positions) in the CT data.

The set includes both solid and non-solid nodules. The diameters of 380 nodules were manually measured using the ELCAP (Early Lung Cancer Action Program) protocol, and used as the ground truth for the experiment.

Figure 1:
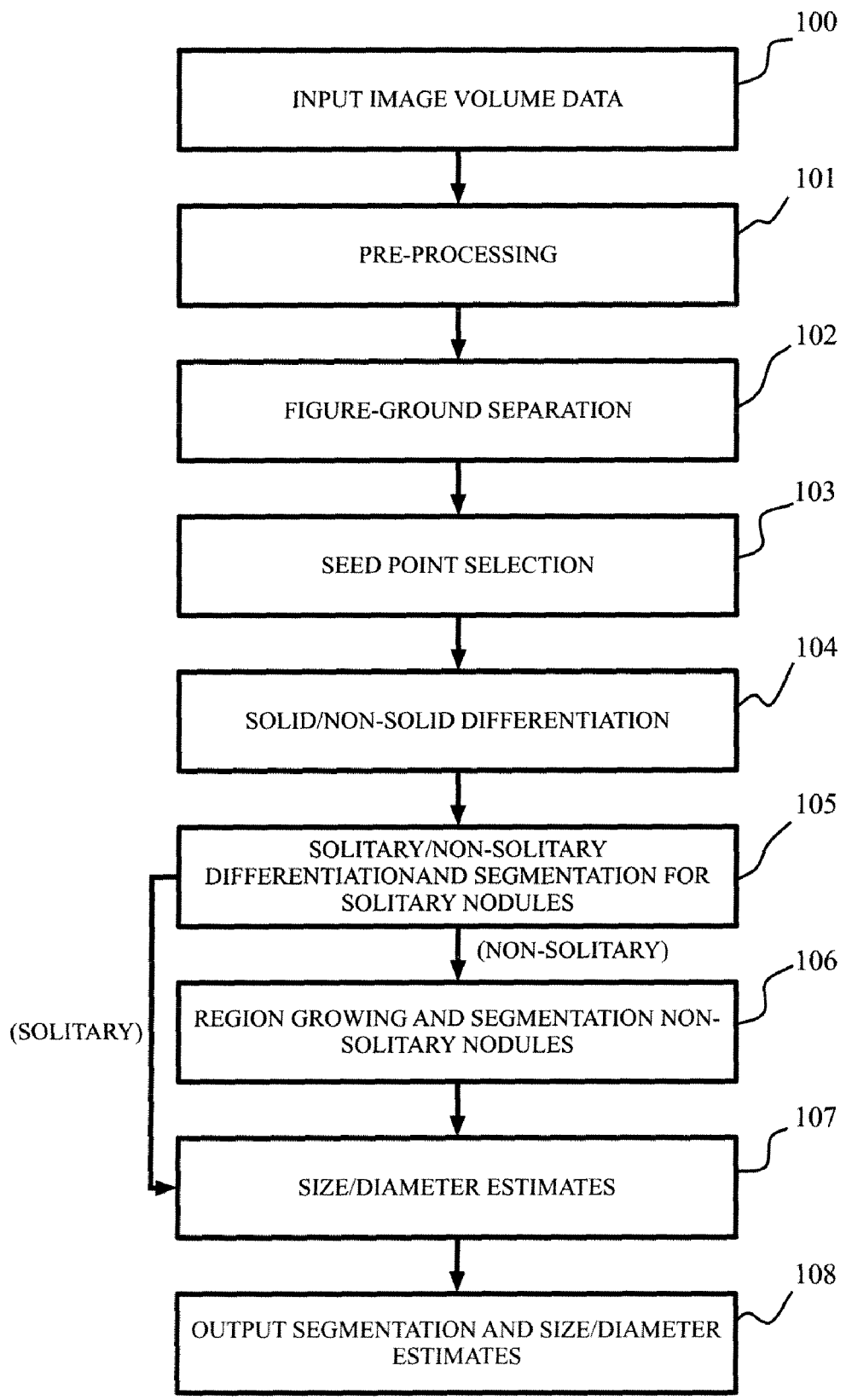
FIG. 1 is a flow chart of an automated method for estimating a volume and diameter of a pulmonary nodule according to an exemplary embodiment of the present disclosure.

Referring to FIG. 1, an exemplary implementation of a method for estimating volume and diameter of a nodule includes pre-processing 101, figure-ground separation 102, seed point selection 103, solid/non-solid differentiation 104, solitary/non-solitary differentiation 105, region growing 106, and size/diameter estimates 107. In FIG. 1, at least elements 101 through 107 can be viewed as software modules for performing an automatic estimation of a measure of the nodule; each module being implemented as computer readable instructions executable by a processor.

A pre-processing module 101 extracts a sub-volume of a fixed size (e.g., 21×21×21 voxels) from an input volume 100 (e.g., a CT volume). The sub-volume is centered at the marked position, which may be off from the actual nodule to be analyzed. If the slice interval is larger than the pixel spacing, a linear interpolation is applied to the sub-volume to make it isotropic. Each voxel data in the sub-volume is represented by a number between 0 and 4095, which is obtained by adding 1024 to the original number in Hounsfield units that measure radiodensity.

A figure-ground separation module 102 separates objects of possible interest from others. A spatial homogeneity constraint may be incorporated via diffusion force while pulling an initial ambiguous state into a mutually exclusive one via competition force. An initial pixel-wise transform of voxel data into a probabilistic quantity is performed.

This stage is performed separately for targeting solid nodules and for non-solid ones. Let f and g denote the values of each voxel before and after the pixel-wise transformation, respectively. For solid nodules, each voxel value undergoes the following transformation.

$$g = \begin{cases} f/1000 & 0 \le f \le 1000 \\ 1 & f > 1000. \end{cases}$$

For non-solid nodules, each voxel value undergoes the following transformation.

$$g = \begin{cases} \dfrac{f - 200}{400} & 100 \le f \le 500 \\ \dfrac{900 - f}{500} & 500 \le f \le 1000 \\ 0 & \text{otherwise.} \end{cases}$$

FIGS. 2A-B show exemplary solid and non-solid transformations, respectively.

After the transformation, the pixel-wise transformed volume undergoes the following processing, which is applied to each voxel sequentially for four sweeps:

$$\bar{g}(i, j, k) = \frac{1}{6}(g(i-1, j, k) + g(i+1, j, k) +$$
$$g(i, j-1, k) + g(i, j+1, k) + g(i, j, k-1) + g(i, j, k+1))$$

$$g(i, j, k) = \lambda \frac{[g(i, j, k)]^2}{[g(i, j, k)]^2 + [1 - g(i, j, k)]^2} + (1 - \lambda)\bar{g}(i, j, k).$$

Note that (i,j,k) is the voxel coordinate, g(i,j,k) is the value of the pixel-transformed volume at (i,j,k), and λ is set to 0.5. The new value of g(i,j,k) computed as above replace the old value immediately.

After the processing, a foreground is obtained by selecting voxels whose values are more than 0.5 (one of ordinary skill in the art will understand that this threshold may be modified, for example, for different implementations). Furthermore, a result with the solid setting is a solid foreground and the other with the non-solid setting is a non-solid foreground. 1 indicates that the voxel is a part of an object of possible interest, and 0 indicates other structures or background.

Seed point selection module 103 relocates the marked position to the center of the nodule. The relocated position is a seed point. Multiple seed points are allowed, since they are used as starting points in the region growing module and a single seed may not be enough to cover the whole nodule by the growing process.

Seed point selection is performed independently on each of the two foreground volumes. If the foreground is empty, the module will return an empty set of seed points. When at least one foreground voxel is present, then the module performs the following computations.

A Euclidean distance transform is computed on the foreground volume. Each voxel in the distance map contains the Euclidean distance to the closest background voxel identified by 0 in the foreground volume. If the voxel belongs to the background, then its distance value is 0.

If the nodule is isolated from other structures, a local maximum of the distance map coincides with the nodule center. However, when it is attached to a lung wall, the local maximum is often found inside the wall instead of the nodule. Thus, to simply pick a local maximum of the distance map is not a reliable way to locate the nodule center. Instead, a template of a perfect sphere may be used and a correlation with the distance map is determined at each voxel.

The template is defined on a neighborhood around the center of the sphere and each entry is the distance from the position to the center. Table 1 shows a template with a 3×3×3 neighborhood. Note that the template is independent of the size of the sphere.

TABLE 1

A sphericity template with a 3 × 3 × 3 neighborhood

| $\sqrt{2}$ | 1 | $\sqrt{2}$ |
| --- | --- | --- |
| 1 | 0 | 1 |
| $\sqrt{2}$ | 1 | $\sqrt{2}$ |

The formula for computing the correlation may be given as:

$$r(x) = \sum_{\Delta \in N} \|\Delta\|(D(x) - D(x - \Delta))$$

where r(x) is the correlation at position x, N is the neighborhood, $\|\Delta\|$ is the Euclidean distance of an offset $\Delta$, and D is the distance map of the foreground.

Strong and sharp peaks are observed near the center of a nodule regardless of if it is attached to a wall or not. A 5×5×5 neighborhood may be used for the template. The correlation value is normalized by the maximum correlation value as:

$$\bar{r}(x) = \frac{r(x)}{\sum_{\Delta \in N} \|\Delta\|^2}.$$

r̄(x) is the sphericity value at x. Seed points are selected as those positions with locally maximum sphericity values that are above a threshold value. The threshold value of 0.5 is selected. When no sphericity values are above the threshold, the position with the largest sphericity is selected.

Note that the above seed point selection stage is done on two foreground volumes: solid and non-solid. Solid/Non-solid differentiation module 104 selects one of the two sets of seed points.

The method includes a determination of whether one of two seed point sets is empty. This check is performed because the figure-ground separation can fail on one of the two settings (solid and non-solid). If one of them is empty, then the other non-empty set is selected. If both are empty, then the method exits.

When both sets are not empty, then the maximum sphericity value of the solid seed points is compared to that of the non-solid seed points. If the former is equal to or larger than the latter, then the solid seed points are selected, else, the non-solid ones are selected.

When a nodule is small and isolated, most voxels are only 1 unit away from the background and the region growing process module tends to under-segment the nodule. On the other hand, the figure-ground separation can extract solitary nodule reliably and efficiently. The solitary/Non-solitary differentiation module 105 checks if the nodule is solitary. If affirmative, the final nodule segmentation is derived from the foreground alone without the region growing.

A connected component analysis is performed on the foreground using a 6-neighborhood system for the connectivity. The component that contains the first seed point is selected. L is used to denote the selected connected component. A series of heuristic tests are applied to L. For it to be solitary, it needs to satisfy three requirements: it has to be small, disjoint from any of six boundaries of the sub-volume, and "compact" in terms of a measure described below.

A comparison of the size of L and the size of the sub-volume is performed. If the number of voxels in L is less than $\frac{1}{8}^{th}$ of the sub-volume, then the first requirement is satisfied. Else, the module returns false indicating that the nodule is not solitary.

Scans of voxels along each of the six boundary planes of the sub-volume are performed. If L touches any of the walls, then the test failed and the module returns false.

The size of L and the size of the minimum bounding box of L are compared. Only non-oriented bounding boxes are considered. If the number of voxels in L is more than a quarter of the size of the bounding box, we call the component "compact" and the module returns true indicating that the nodule is solitary. Else, it returns false.

If the solitary test failed, the region growing module 106 isolates a nodule portion from other structures. A region is grown starting from the seed point toward directions that reduce the distance values in the distance map. The process is performed from each seed point and the segmentation is the union of regions resulted from each seed point.

The region growing module 106 is implemented to perform two steps. In a first step, the region is grown conservatively using the distance value of the seed point. The distance value at the seed point is denoted as d. Note that d is the minimum distance from the point to the background voxels. Voxels within the distance of d−1 away from the seed point are clearly within the nodule provided that the seed point is located within the nodule (not necessarily at the center of the nodule). Thus, these voxels are included in the region. This step makes the next step more robust. For example, it is not always true that the seed point coincides with the local maximum of the distance map. Since the growing process will grow only towards the directions with smaller distance values, those voxels with larger distance values will not be included in the region. As a result, a final segmentation may contain a missing part. By having this first step, voxels with the largest distance value within the nodule are highly likely to be included in the region, unless the nodule is lobulated or spiculated.

Second step is to include incrementally foreground voxels that are adjacent to the front of the current region and whose distance values are less than the distance value of at least one of adjacent front voxels. This incremental growth process continues until there is no change to the region.

After the region growing, the size/diameter estimates module 107 estimates the volume and diameter of the nodule using the segmentation. The ELCAP protocol may be used to measure the diameter, which uses the axial slice with the largest area for the measurement. Within the slice, the largest distance between a pair of voxels is computed. The distance between the two voxels is the major axis, and the line connecting the two is the major axis. The method includes scanning along the direction perpendicular to the major axis and finds a pair of voxels with the largest distance apart, which is the minor distance. The estimate of the radius is the arithmetic mean of the major and minor distances. The volume is calculated as the number of voxels in the segmentation times the size of a voxel in mm$^3$.

The Pearson correlation coefficient between the manual measurement and automated estimate was 0.78. The estimation error is normally distributed with mean of 0.29 and standard deviation of 1.80. The maximum error was 9.70, and the minimum error was −6.89. The average and maximum computation time for the 380 nodules was 0.04 and 0.06 seconds, respectively, on a PC with 2.79 GHz CPU and 1 G bytes of memory. FIG. 3 shows results from an exemplary algorithm applied to a wall attached nodule showing intermediate and a resulting segmentation.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 4:
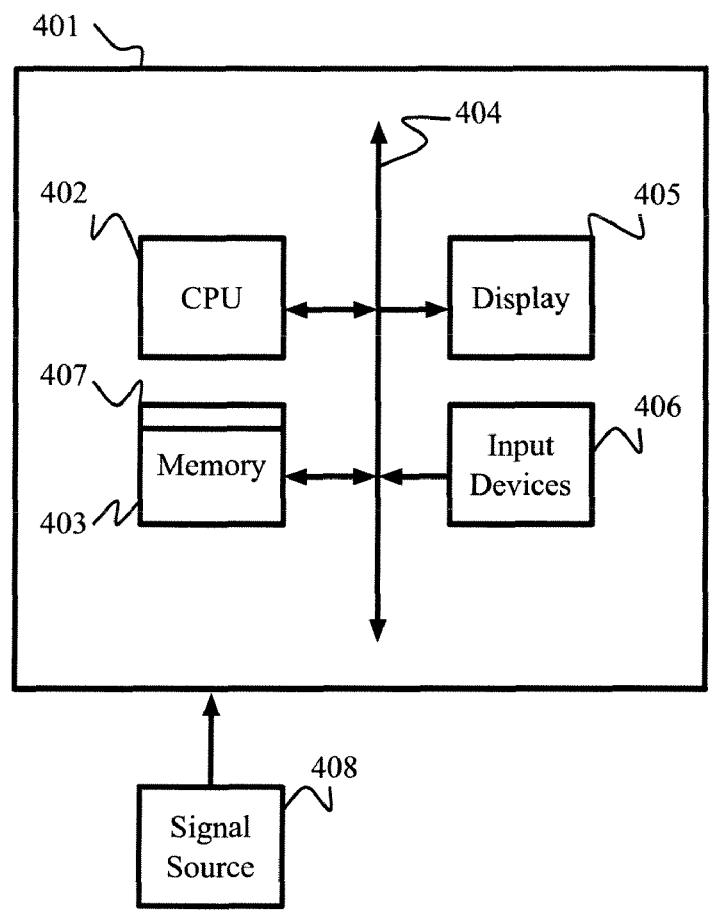
FIG. 4 is a diagram of exemplary computer system for automatically estimating a volume and diameter of a pulmonary nodule according to an embodiment of the present disclosure.

Referring to FIG. 4, according to an embodiment of the present invention, a computer system 401 for implementing a method for automatically estimating a volume and diameter of a pulmonary nodule from thin-slice Computed Tomography (CT) data can comprise, inter alia, a central processing unit (CPU) 402, a memory 403 and an input/output (I/O) interface 404. The computer system 401 is generally coupled through the I/O interface 404 to a display 405 and various input devices 106 such as a mouse and keyboard. The support circuits can include circuits such as cache, power supplies, clock circuits, and a communications bus. The memory 403 can include random access memory (RAM), read only memory (ROM), disk drive, tape drive, etc., or a combination thereof. The present invention can be implemented as a routine 407 that is stored in memory 403 and executed by the CPU 402 to process the signal from the signal source 408. As such, the computer system 101 is a general purpose computer system that becomes a specific purpose computer system when executing the routine 407 of the present invention.

The computer platform 401 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Disclosed methods for automatically estimating a volume and diameter of a pulmonary nodule from thin-slice Computed Tomography (CT) data are effective in estimating the diameter of pulmonary nodules. The techniques can be used to assist readers in evaluating the growth of a nodule in a consistent manner. The techniques can also be used to improve the performance of CAD systems. Since large nodules and small ones have different geometrical characteristics, it may be advantageous for a CAD system to further examine its initial findings by categorizing them based on the size estimates. The system can apply different criteria based on the size category to more reliably separate nodules from false positives.

Having described embodiments for automatically estimating a volume and diameter of a pulmonary nodule from thin-slice Computed Tomography (CT) data, it is noted that modifications and variations can be made by persons skilled in the art in light of the above teachings. It is therefore to be understood that changes may be made in embodiments of the present disclosure that are within the scope and spirit thereof.

What is claimed is:

1. A computer readable medium embodying instructions executable by a processor to perform a method for automatically estimating a measure of a nodule, the method steps comprising:

provinding sliced image volume data comprising at least one marked position of the nodule;

extracting a sub-volume from the sliced image volume data that includes the marked position;

performing a figure-ground separation to determine a solid foreground of the sub-volume and a non-solid foreground of the sub-volume;

determining a seed point corresponding to the nodule from each of the solid foreground and the non-solid foreground;

wherein the determination of the seed point for each of the solid foreground and the non-solid foreground comprises: determining a center of the nodule by determining a correlation between a template of a sphere and a distance map, the correlation being determined at each voxel; and determining the selected seed point as the seed point having one of a locally maximum sphericity above a threshold or a largest sphericity;

selecting one of the seed point of the solid foreground or the seed point of the non-solid foreground; determining whether the selected seed point is solitary or non-solitary and performing region growing for non-solitary selected seed point;

determining a segmentation of the selected seed point;

estimating the measure of the nodule corresponding to the segmentation;

and outputting the segmentation and an estimate of the measure of the nodule.

2. The method of claim 1, wherein the selection of one of the seed points corresponding to the solid foreground or the non-solid foreground comprises:

determining whether a seed point set of the solid foreground or the non-solid foreground is empty, and upon determining one of the solid foreground or the non-solid foreground to be non-empty and the other set to be empty, selecting the non-empty set; and determining whether both the seed point set of the solid foreground and the seed point set of the non-solid foreground are non-empty, and upon determining that both the seed point set of the solid foreground and the seed point set of the non-solid foreground are non-empty, comparing a maximum sphericity value of the seed point sets and selecting the seed point set of the solid foreground upon determining it to include the seed point having the maximum sphericity value equal to or greater than that of the non-solid foreground, and selecting the seed point set of the non-solid foreground upon determining it to include the seed point having the maximum sphericity value greater than that of the solid foreground.

3. A computer readable medium embodying instructions executable by a processor to perform a method for automatically estimating a measure of a nodule, the method steps comprising:

providing sliced image volume data comprising at least one marked position of the nodule;

extracting a sub-volume from the sliced image volume data that includes the marked position;

separating a background from a foreground including the nodule using a pixel-wise transform of voxel data of the sub-volume and a competition-diffusion operator, determining a solid foreground portion and a non-solid foreground portion of the foreground;

determining a seed point for each of the solid foreground portion and the non-solid foreground portion by relocating the marked position to a center of the nodule, wherein a relocated positions are the seed points; and wherein the determination of the seed point for each of the solid foreground portion and the non-solid foreground portion comprises: determining a center of the nodule by determining a correlation between a template of a sphere and a distance map, the correlation being determined at each voxel; and determining the selected seed point as the seed point having one of a locally maximum sphericity above a threshold or largest sphericity;

selecting one of the seed points corresponding to the solid foreground or the non-solid foreground;

determining whether a selected seed point is solitary, and determining segmentation upon determining that the selected seed point is solitary;

performing region growing to isolate the nodule upon determining that the selected seed point is non-solitary and determining the segmentation as a region of the selected seed point;

determining the measure based on the segmentation using an axial slice with the largest area for the measure;

and outputting the segmentation and the measure.

4. The method of claim 3, wherein the sub-volume is centered on the marked position.

5. The method of claim 3, wherein the selection of one of the seed points corresponding to the solid foreground or the non-solid foreground comprises:
- determining whether a seed point set of the solid foreground or the non-solid foreground is empty, and upon determining one of the solid foreground or the non-solid foreground to be non-empty and the other set to be empty, selecting the non-empty set; and
- determining whether both seed point set of the solid foreground and seed point set of the non-solid foreground are non-empty, and upon determining that both seed point set of the solid foreground and seed point set of the non-solid foreground are non-empty, comparing a maximum sphericity value of the seed point sets and selecting the seed point set of the solid foreground upon determining it to include the seed point having the maximum sphericity value equal to or greater than that of the non-solid foreground, and selecting the seed point set of the non-solid foreground upon determining it to include the seed point having the maximum sphericity value greater than that of the solid foreground.

6. A system for automatically estimating a measure of a nodule comprising:
- a memory device storing a dataset comprising image volume data including marked positions of the nodule and a plurality of instructions embodying the system for estimating the measure of the nodule;
- and a processor for receiving the dataset and executing the plurality of instructions to perform a method comprising,
- extracting a sub-volume from the sliced image volume data that includes the marked position;
- separating a background from a foreground including the nodule using a pixel-wise transform of voxel data of the sub-volume,
- determining a solid foreground portion and a non-solid foreground portion of the foreground;
- determining a seed point for each of the solid foreground portion and the non-solid foreground portion by relocating the marked position to a center of the nodule; wherein the determination of the seed point for each of the solid foreground portion and the non-solid foreground portion comprises: determining a center of the nodule by determining a correlation between a template of a sphere and a distance map, the correlation being determined at each voxel; and determining the selected seed point as the seed point having one of a locally maximum sphericity above a threshold or largest sphericity, wherein a relocated positions are the seed points;
- selecting one of the seed points corresponding to the solid foreground or the non-solid foreground;
- determining whether a selected seed point is solitary, and determining a segmentation upon determining that the selected seed point is solitary;
- performing region growing to isolate the nodule upon determining that the selected seed point is non-solitary and determining the segmentation as a region of the selected seed point;
- determining at least one of a size estimate and a diameter estimate based on the segmentation using an axial slice with the largest area for the size estimate and/or the diameter estimate;
- and outputting the segmentation and the measure.

* * * * *